Jan. 12, 1960   E. R. DUNN   2,920,427
EJECTOR WORK REMOVING DEVICE
Filed Dec. 7, 1956   2 Sheets-Sheet 1
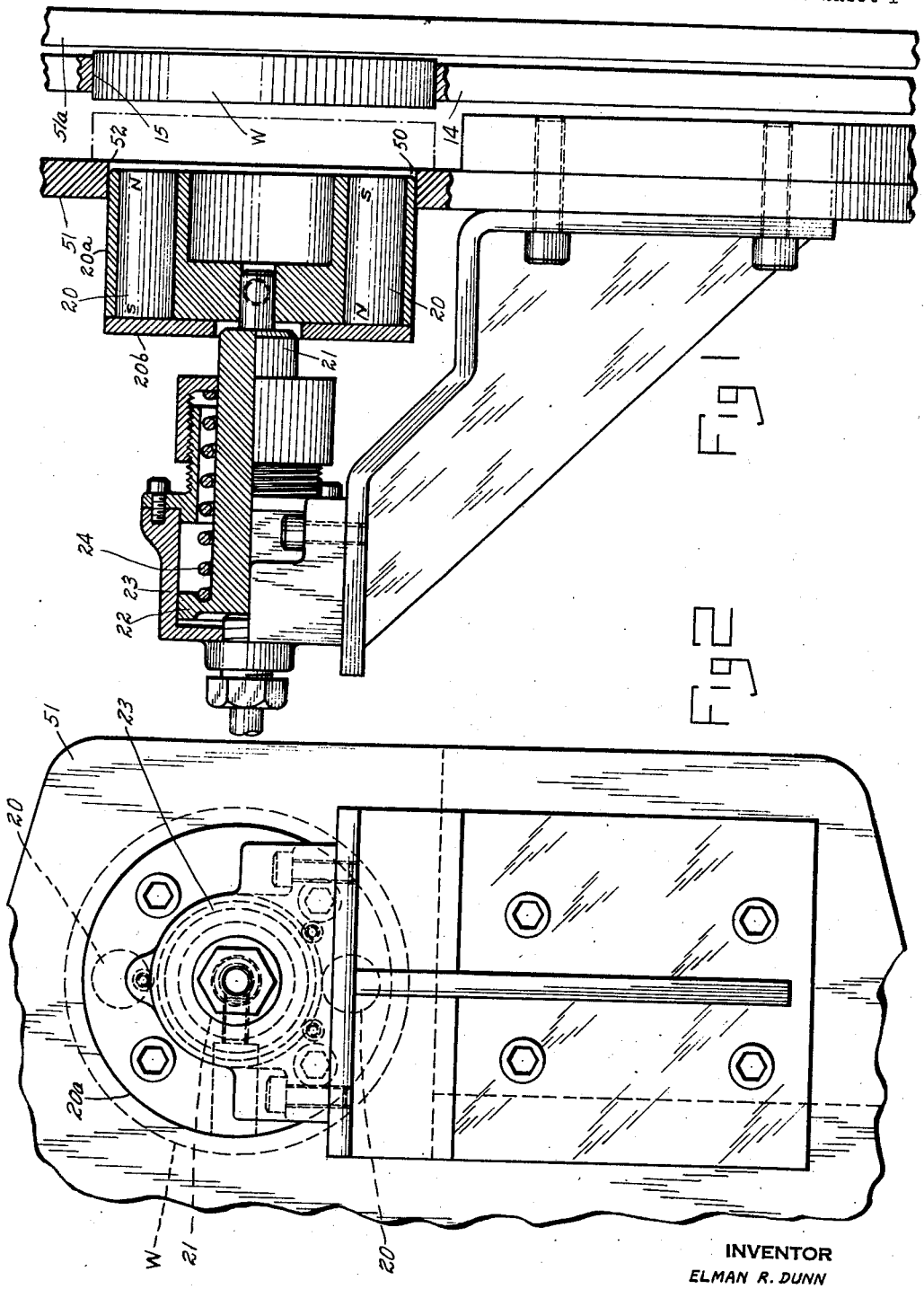
INVENTOR
ELMAN R. DUNN
BY
ATTORNEY

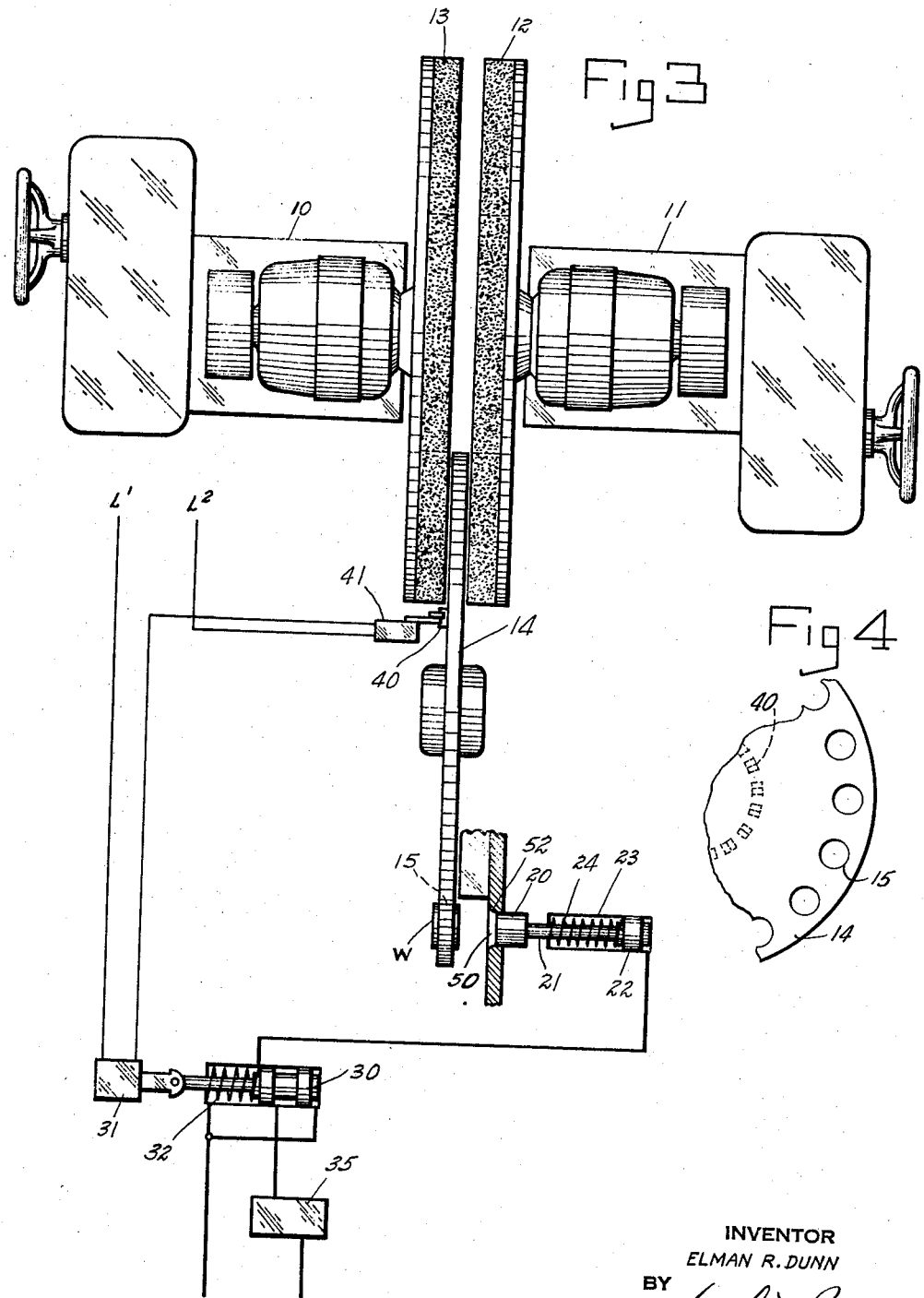

United States Patent Office 2,920,427
Patented Jan. 12, 1960

2,920,427

EJECTOR WORK REMOVING DEVICE

Elman R. Dunn, Beloit, Wis., assignor to Gardner Machine Company, Beloit, Wis.

Application December 7, 1956, Serial No. 626,940

5 Claims. (Cl. 51—118)

This invention relates to surface grinders of the type known as double disc grinders in which workpieces are passed between the opposed angular faces of the discs in order to grind both surfaces of the workpiece parallel.

A common form of carrier for moving the workpieces between the discs consists of a rotatable disc member having suitable openings therein for insertion of unground workpieces. After the work has passed through the grinding zone, it must be removed from the carrier disc. The usual means for removing workpieces from the carrier consists of a spring-finger device which frequently fails to move the workpiece squarely and evenly and as a result, the workpiece would become caught sideways or "cocked" in the carrier opening.

An object of this invention is to provide an improved work extractor which will hold the work square as it is removed from the carrier and thus prevent the work from becoming caught in the carrier opening.

Another object is to provide a magnetic device actuated in timed relation with the movement of the carrier to engage a ground workpiece and draw it out of the carrier.

Another object is to provide means for removing the workpiece from the magnet.

Figure 1 is a partial rear elevation showing the relation of the extractor to the carrier.

Figure 2 is a partial right end elevation of the extractor.

Figure 3 is a diagrammatic sketch of a double disc grinder equipped with an extractor, and electric and pneumatic controls for actuating the extractor.

Figure 4 is a partial end view of the carrier disc showing the cams.

Numerals 10 and 11 indicate supporting members on which grinding discs 12 and 13 are rotatably mounted. 14 is a rotatable work carrier having a plurality of openings 15 for receiving workpieces W.

A magnetic extractor 20a, comprising a pair of magnets 20, is attached to one end of a piston rod 21, at the other end of which is a piston 22 slidably mounted in cylinder 23. Magnet poles are disposed as shown and joined by pole-piece 20b which is of magnetic material. Piston 22 is urged to the left of said cylinder 23 by a spring 24. Said piston 22 is moved in the opposite direction against said spring 24 by means of fluid under pressure directed to the left end of said cylinder 23 from a valve 30 having a solenoid 31 attached thereto and a spring 32 urging said valve 30 to the right. Fluid under pressure is supplied to said valve 30 from an accumulator or other suitable source 35. Solenoid 31 is actuated in timed relation to the rotation of carrier 14 by a series of cams or camming holes 40 on said carrier. Said cams 40 actuate limit switch 41 to energize solenoid 31 and move valve 30 to the left against spring 32. In this position of valve 30, fluid under pressure is directed to the head end of cylinder 23 to shift piston 22 to the left against spring 24. Extractor 20a is thus moved through an opening 50 in guide plate 51 into contact with workpiece W. Another guide plate 51a guides the workpiece as it emerges from between the grinding discs 12 and 13. Cams 40 are positioned on the carrier to cause the extractor to advance to work engaging position at the proper time.

The movement of the carrier 14 and camming holes 40 then releases limit switch 41 and permits spring 24 to withdraw the extractor 20a carrying with it the workpiece W. As the extractor 20a passes through the opening 50, workpiece W engages surface 52 surrounding said opening 50 to remove itself from the extractor 20a.

The diameter of the opening 50 and the nature of the surface 52 are such as to provide a minimum of contact between the workpiece and the guide plate 51 and thus prevents adhesion of the workpiece to the guide plate 51 due to the presence of coolant, grease, etc.

I claim:

1. In a disc grinder, a rotatable carrier having arcuately spaced recesses for receiving workpieces, a grinding zone formed by the path of said workpieces across a grinding disc, means for removing said workpieces from said recesses after a grinding operation comprises spaced guide plates between which the work carrier emerges from the grinding zone, an opening in one of said guide plates, a magnet mounted for movement through said opening, means for moving said magnet toward and from a position adjacent the carrier, and means responsive to rotation of the carrier for actuating said magnet moving means.

2. In a disc grinder, a rotatable carrier having arcuately spaced recesses for receiving workpieces, a grinding zone formed by the path of said workpieces across a grinding disc, means for removing said workpieces from said recesses after a grinding operation comprising spaced guide plates between which the work carrier emerges from the grinding zone, an opening in one of said guide plates, a magnet mounted for movement through said opening, means for moving said magnet toward and from a position adjacent the carrier, and means adjacent said opening for insuring removal of said workpieces from said magnet after the withdrawal of said workpieces from the carrier.

3. In a disc grinder, a rotatable carrier having arcuately spaced recesses for receiving workpieces, a grinding zone formed by the path of said workpieces across a grinding disc, means for removing said workpieces from said recesses after a grinding operation comprising spaced guide plates between which the work carrier emerges from the grinding zone, an opening in one of said guide plates, a magnet mounted for movement through said opening, means for moving said magnet toward and from a position adjacent the carrier, means responsive to rotation of the carrier for actuating said magnet moving means, and means adjacent said opening for insuring removal of said workpieces from said magnet after the withdrawal of said workpieces from the carrier.

4. In a disc grinder, a rotatable carrier having arcuately spaced recesses for receiving workpieces, a grinding zone formed by the path of said workpieces across a grinding disc, means for removing said workpieces from said recesses after a grinding operation comprising spaced guide plates between which the work carrier emerges from the grinding zone, an opening in one of said guide plates, a magnet mounted for movement through said opening, means for moving said magnet toward and from a position adjacent the carrier, and means adjacent said opening for insuring removal of said workpieces from said magnet after the withdrawal of said workpieces from the carrier, including a work ejecting surface formed to provide a minimum of adhesion between said surface and a workpiece.

5. In a disc grinder, a rotatable carrier having arcuately spaced recesses for receiving workpieces, a grinding zone formed by the path of said workpieces across a grinding disc, means for removing said workpieces from said recesses after a grinding operation comprising spaced guide plates between which the work carrier emerges from the grinding zone, an opening in one of said guide plates, a magnet mounted for movement through said opening, means for moving said magnet toward and from a position adjacent the carrier, and means adjacent said opening for insuring removal of said workpieces from said magnet after the withdrawal of said workpieces from the carrier including a surface having a minimum of contact with said workpiece.

References Cited in the file of this patent

UNITED STATES PATENTS

| | | |
|---|---|---|
| 1,164,336 | Erickson et al. | Dec. 14, 1915 |
| 1,551,155 | Johnson | Aug. 25, 1925 |